(12) United States Patent  (10) Patent No.: US 8,929,440 B2
Nguyen et al.  (45) Date of Patent: Jan. 6, 2015

(54) QP ADAPTIVE COEFFICIENTS SCANNING AND APPLICATION

(75) Inventors: Thai-Ha Nguyen, Daly City, CA (US); Yoichi Yagasaki, Tokyo (JP); Ali Tabatabai, Cupertino, CA (US)

(73) Assignee: Sony Corporation, Tokyo (JP)

( * ) Notice: Subject to any disclaimer, the term of this patent is extended or adjusted under 35 U.S.C. 154(b) by 483 days.

(21) Appl. No.: 13/078,779

(22) Filed: Apr. 1, 2011

(65) Prior Publication Data

US 2011/0249726 A1  Oct. 13, 2011

Related U.S. Application Data

(60) Provisional application No. 61/322,736, filed on Apr. 9, 2010.

(51) Int. Cl.
*H04N 7/32* (2006.01)
*H04N 19/157* (2014.01)
*H04N 19/129* (2014.01)
*H04N 19/176* (2014.01)
*H04N 19/61* (2014.01)

(52) U.S. Cl.
CPC ... *H04N 19/00212* (2013.01); *H04N 19/00109* (2013.01); *H04N 19/00278* (2013.01); *H04N 19/00781* (2013.01)
USPC ...................................................... 375/240.03

(58) Field of Classification Search
CPC .. H04N 7/12; H04N 19/109; H04N 19/00781
USPC ........................................ 375/240.03, 240.12
IPC ....................................................... H04N 7/12
See application file for complete search history.

(56) References Cited

U.S. PATENT DOCUMENTS

| 5,721,822 A * | 2/1998 | Agarwal ................. 375/E7.001 |
| 6,539,412 B1 | 3/2003 | Kim et al. |
| 6,628,716 B1 | 9/2003 | Tan et al. |

(Continued)

FOREIGN PATENT DOCUMENTS

WO  2009110673 A1  9/2009

OTHER PUBLICATIONS

Dragotti, P. et al.—"Discrete directional wavelet bases and frames for image compression and denoising"—Proc. vol. 5150, Visual Communications and Image Processing, 2003, pp. 1287-1295.
Nguyen et al.—"Directional Discrete Wavelet Transform (DDWT) for Video Compression Applications"—utility U.S. Appl. No. 12/962,645, filed Dec. 7, 2010, pp. 1-51.

*Primary Examiner* — Jay Patel
*Assistant Examiner* — Francis G Geroleo
(74) *Attorney, Agent, or Firm* — John P. O'Banion

(57) ABSTRACT

Entropy encoding is performed in the inventive apparatus and method in response to the scanning of transform coefficients following an initial scanning pattern selected on the basis of probability statistics of non-zero coefficients for each block position. These non-zero probability statistics are ranked for a given combination of coding characteristics within the current block to arrive at an initial scanning pattern. The same initial scanning pattern selection is performed in the decoder to allow the transform coefficients to be extracted in their proper order from encoded video data. The pattern selection is applicable to both intra prediction and inter prediction. Transform coefficients are more accurately ordered in response to the invention because in adapting pattern initialization to quantization step size, high-frequency basis functions are properly taken into account.

20 Claims, 3 Drawing Sheets

(56) References Cited

U.S. PATENT DOCUMENTS

| | | |
|---|---|---|
| 7,336,720 B2 | 2/2008 | Martemyanov et al. |
| 7,620,103 B2 | 11/2009 | Cote et al. |
| 8,000,546 B2 * | 8/2011 | Yang et al. ............... 375/240.02 |
| 8,311,119 B2 * | 11/2012 | Srinivasan ............... 375/240.18 |
| 2006/0233255 A1 * | 10/2006 | Ridge et al. .............. 375/240.18 |
| 2008/0304562 A1 | 12/2008 | Chang et al. |
| 2008/0310745 A1 * | 12/2008 | Ye et al. ........................ 382/238 |
| 2011/0243220 A1 * | 10/2011 | Seregin et al. ........... 375/240.02 |
| 2011/0268183 A1 * | 11/2011 | Sole et al. ................ 375/240.03 |

* cited by examiner

US 8,929,440 B2

QP ADAPTIVE COEFFICIENTS SCANNING AND APPLICATION

CROSS-REFERENCE TO RELATED APPLICATIONS

This application claims priority from U.S. provisional application Ser. No. 61/322,736 filed on Apr. 9, 2010, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to entropy coding in video compression, and more particularly to quantization parameter adaptive coefficient scanning in video compression.

2. Description of Related Art

Advanced video coding, such as H.264/AVC, can utilize both spatial and temporal predictions to increase coding gain. Producing an efficient encoded video bitstream generally involves an encoder performing block partitioning, prediction, transforms, quantization, coefficient scanning and entropy encoding. Decoding of encoded video by a decoder is performed substantially in the reverse process.

The process of converting the two-dimensional (2D) block of transform coefficients into a one-dimensional (1D) signal, involves executing a process according to a scanning pattern, followed by a coding process, such as run-length coding, to make the resulting encoded video signal stream more compact. During scanning it is preferable that the larger, more significant, coefficients are scanned at the beginning of the sequence so as to be more efficiently coded in the encoded video.

Traditional H.264/AVC scanning is performed according to a fixed scanning pattern, such as discrete cosine transforms (DCT) in a zigzag scanning pattern starting from the lowest frequency coefficient (DC) to the highest frequency coefficient. Alternatively, adaptive scanning is utilized such as described with mode-dependent directional transforms (MDDT). In certain forms of adaptive scanning, the scanning pattern is initialized based on the intra prediction mode and then an algorithm applied at both encoder and decoder to update the scanning patterns.

However, each of these approaches provide a limited coding efficiency.

Accordingly, there is a need for more efficient video coding processes. The present invention fulfills that need and overcomes shortcomings of previous coding techniques and their associated coefficient scanning mechanisms.

BRIEF SUMMARY OF THE INVENTION

An apparatus and method of performing video coding is described in which scanning pattern initialization is enhanced. Previously, scanning pattern initialization had a negative impact on coding efficiency at the beginning of a frame or slice at which it was initialized. Teachings of the present invention overcome those shortcomings. Instead of using fixed statistics to initialize and update the scanning pattern, a different set of statistics are utilized in response to training based on the data which takes into account quantization step-size (QP). In particular, statistics are collected during a training process which reflect the probability of non-zero coefficients at each block position for each combination of encoding characteristics comprising block size, prediction mode, and quantization parameter (QP). An initial scanning pattern is then determined by ranking these statistics for a given combination of encoding characteristics (block size, prediction mode and quantization parameter) based on the non-zero statistics.

The present invention is applicable to both intra and inter coding, and can be applied to a number of different applications which require video coding, such as coder-decoders (Codecs), internet protocol television (IPTV), cameras, cell phones, and similar video applications.

The invention is amenable to being embodied in a number of ways, including but not limited to the following descriptions.

One embodiment of the invention is an apparatus for coding video data, comprising: (a) a computer configured for encoding and/or decoding of video; (2) and programming executable on the computer for initializing a transform coefficient scanning pattern within video predictive coding by, (2)(a) collecting information on block size, intra prediction mode, and quantization parameter (QP) applied to transform coefficients, (2)(b) performing a ranking of statistical entries collected during a training process of how often an entry in the transform domain is non-zero for a given combination of block size, intra prediction mode, and quantization parameter (QP), and (2)(c) selecting an initial transform coefficient scanning pattern in response to the ranking, wherein the initial transform coefficient scanning pattern is utilized for determining the order in which transform coefficients are encoded into an encoded video signal.

At least one embodiment of the invention is configured so that programming executable on the computer is configured for selecting an initial transform coefficient scanning pattern which is adaptive based on how frequently (how often) transform coefficients are non-zero. At least one embodiment of the invention has programming adapted for using a fixed or adaptive transform coefficient scanning order. At least one embodiment of the invention has programming configured for initializing the transform coefficient scanning pattern for each new intra picture during the video predictive coding. At least one embodiment of the invention is with programming that selects the initial transform coefficient scanning pattern based on prior training of the apparatus, in which during training statistics are determined on how often a transform coefficient position within the block is non-zero for each combination of block size, prediction mode and quantization parameter.

At least one embodiment of the invention is a video encoder. At least one embodiment of the invention is a video encoder with programming configured for performing a transform to create transform coefficients (e.g., frequency coefficients when using a DCT transform), quantizing the transform coefficients, selecting an initial transform coefficient scanning pattern to order the placement of transform coefficients prior to entropy coding within the encoded video signal. At least one embodiment of the invention is a video decoder. At least one embodiment of the invention is a video decoder having programming configured for determining the selection of initial transform coefficient scanning pattern so that the ordering of transform coefficients received in an encoded video signal by the video decoder, prior to performing inverse quantization and inverse transforms within the video decoder.

One embodiment of the invention is an apparatus for coding video data, comprising: (a) a computer configured for encoding and/or decoding of video; and (b) programming executable on the computer for initializing a fixed or adaptive transform coefficient scanning pattern within video predictive coding by, (b)(i) collecting information on block size, intra prediction mode, and quantization parameter (QP) applied to transform coefficients, (b)(ii) performing a ranking of statistical entries collected during a training process of how often an entry in the transform domain is non-zero for a given combination of block size, intra prediction mode, and quantization parameter (QP), and (b)(iii) selecting an initial transform coefficient scanning pattern in response to the ranking, and (b)(iv) performing initialization of transform coefficient scanning pattern by selecting an initial transform coefficient scanning pattern for each new intra picture during the video predictive coding, wherein the initial transform coefficient scanning pattern is utilized for determining the order in which transform coefficients are encoded into an encoded video signal.

One embodiment of the invention is a method of initializing a scanning pattern for transform coefficients during coding of video in a predictive video coding device, comprising: (a) collecting information on block size, intra prediction mode, and quantization parameter (QP) applied to transform coefficients by a predictive video coding device; (b) performing a ranking of statistical entries collected during a training process of how often an entry in the transform domain is non-zero for a given combination of block size, intra prediction mode, and quantization parameter (QP); and (c) selecting an initial transform coefficient scanning pattern in response to the ranking, wherein the initial transform coefficient scanning pattern is utilized for determining the order in which transform coefficients are encoded into an encoded video signal.

The present invention provides a number of beneficial elements which can be implemented either separately or in any desired combination without departing from the present teachings.

An element of the invention is an apparatus and method of improving scanning pattern initialization within predictive video coders based on a different set of statistics which take into account quantization step-size (QP).

Another element of the invention is improved scanning pattern initialization which can be performed within both encoders and/or decoders.

Another element of the invention is scanning pattern initialization which collects coding characteristics of block size, intra prediction mode, and quantization parameter (QP) which are applied to initialization of the scanning pattern for transform coefficients.

Another element of the invention is a scanning pattern initialization which can be applied to video coders utilizing various transforms, such as discrete cosine transforms (DCT), mode dependent directional transforms (MDDT), discrete wavelet transforms (DWT), and other transforms without limitation.

Another element of the invention is a scanning pattern initialization which is selected in response to determining a ranking of statistics collected during training for a given combination of coding characteristics for the current block which include quantization parameter (step size).

A still further element of the invention is a method of scanning pattern initialization which can be applied during video encoding and/or decoding in a wide range of video applications, including codecs, cameras, video recording and playback devices, video processing applications, and so forth.

Further elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1A:
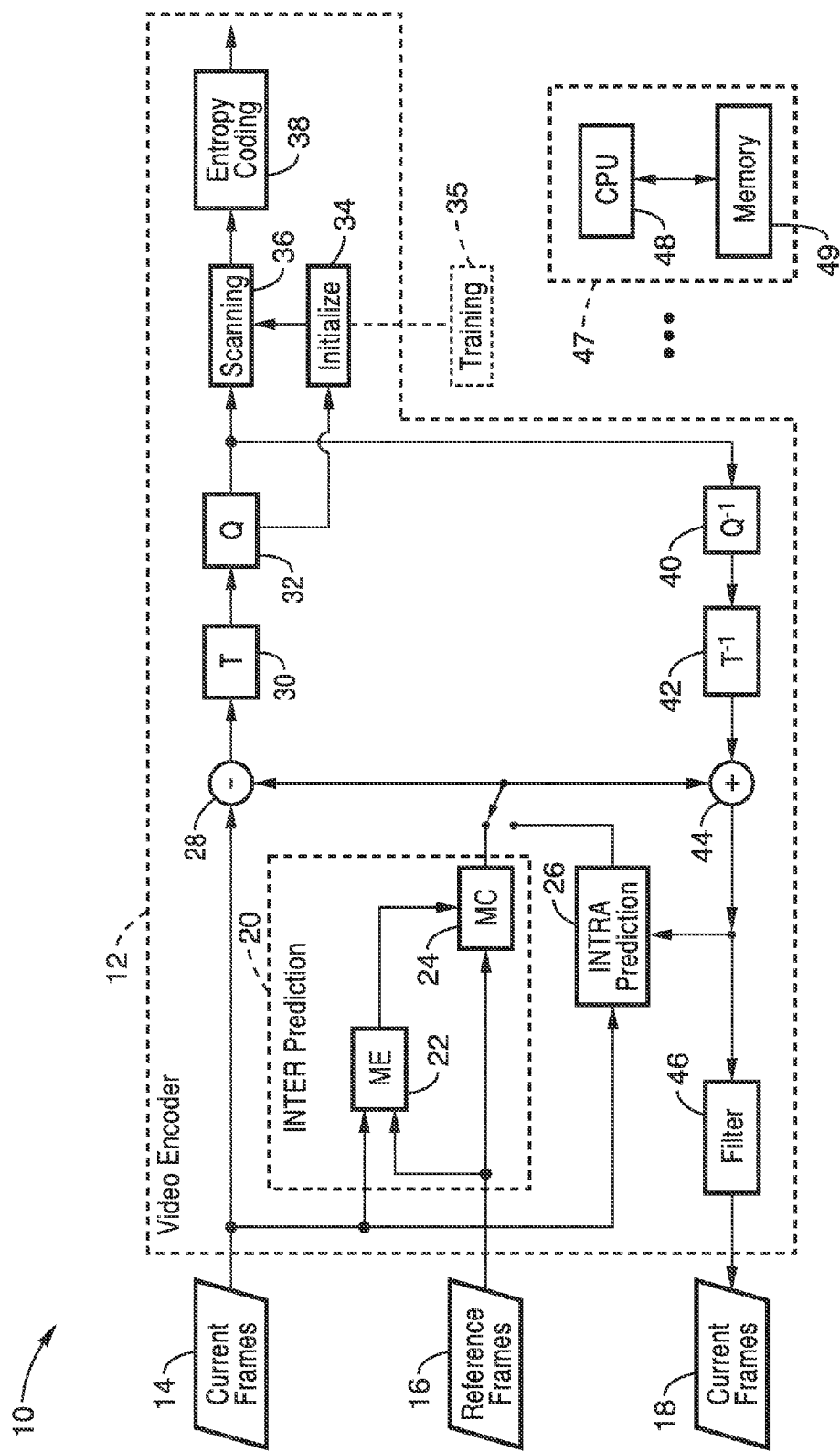
FIG. 1A and FIG. 1B are schematics of predictive coders according to an embodiment of the present invention, showing coefficient scanning which is initialized according to the present invention.

Efficient video compression requires an effective means of coding transform coefficients into an encoded video bit stream, and then of accurately extracting those transform coefficients during the decoding process.

During encoding, after obtaining and quantizing the transform coefficients, they are coded into a video output signal in response to scanning and compression coding. In the scanning process, coefficients are scanned according to a pattern to convert the 2D block of transform coefficients into a 1D string of transform coefficients, which can be considered a 1D signal. An optimal scanning pattern is obtained when the transform coefficients are scanned in a decreasing order of significance. In this decreasing scanning order, for example, the most significant coefficient is scanned first and the other coefficients are scanned in order until finally the least significant coefficient is scanned.

This string of coefficients in the 1D signal is then compressed into an output. Lossless compression is usually performed using a form of run length coding which minimizes the number of bits necessary for encoding the data. In run length coding runs (sequences) of data in which adjacent fields contain the same data are stored as a single data value and a count value, thus saving space. It can be readily appreciated how a proper scanning pattern which orders the coefficients in a decreasing order would improve compression efficiency.

In existing video codecs (e.g., AVC/H.264), the transform coefficients are scanned using a fixed zigzag pattern from the most significant coefficients to the least significant coefficients which are to be coded. Other forms of video coding are known which adaptively select a scanning pattern. These fixed and adaptive scanning methods currently provide limited effectiveness.

It will be appreciated that with DCT transforms, the lowest frequency coefficient (the DC) is the most significant coefficient, while the highest frequency coefficient is the least significant coefficient. In addition, video coding systems may utilize coefficients in response to other transforms, such as mode dependent directional transforms (MDDT), discrete wavelet transforms (DWT), and other transforms without limitation, wherein the coefficients are scanned in an order responsive to the value of the coefficient in the given transform domain. The present invention can be utilized with video coding devices that utilize any desired transforms which would benefit from an optimized initial scanning pattern.

It has been determined in the present invention that one significant limitation of existing techniques is that the coding characteristics utilized for initializing the scanning pattern, and/or adapting the pattern, do not take into account that different quantization step sizes, generally referred to as quantization parameter (QP), can impact optimum scanning order. If the initialization is performed without being configured to take QP into account, then it lacks full effectiveness, and the resulting scanning is often inaccurate. The present invention teaches an alternative way of initializing the scanning pattern, which can be implemented with inter predictive and intra predictive coding devices (e.g., encoders and/or decoder).

Figure 1B:
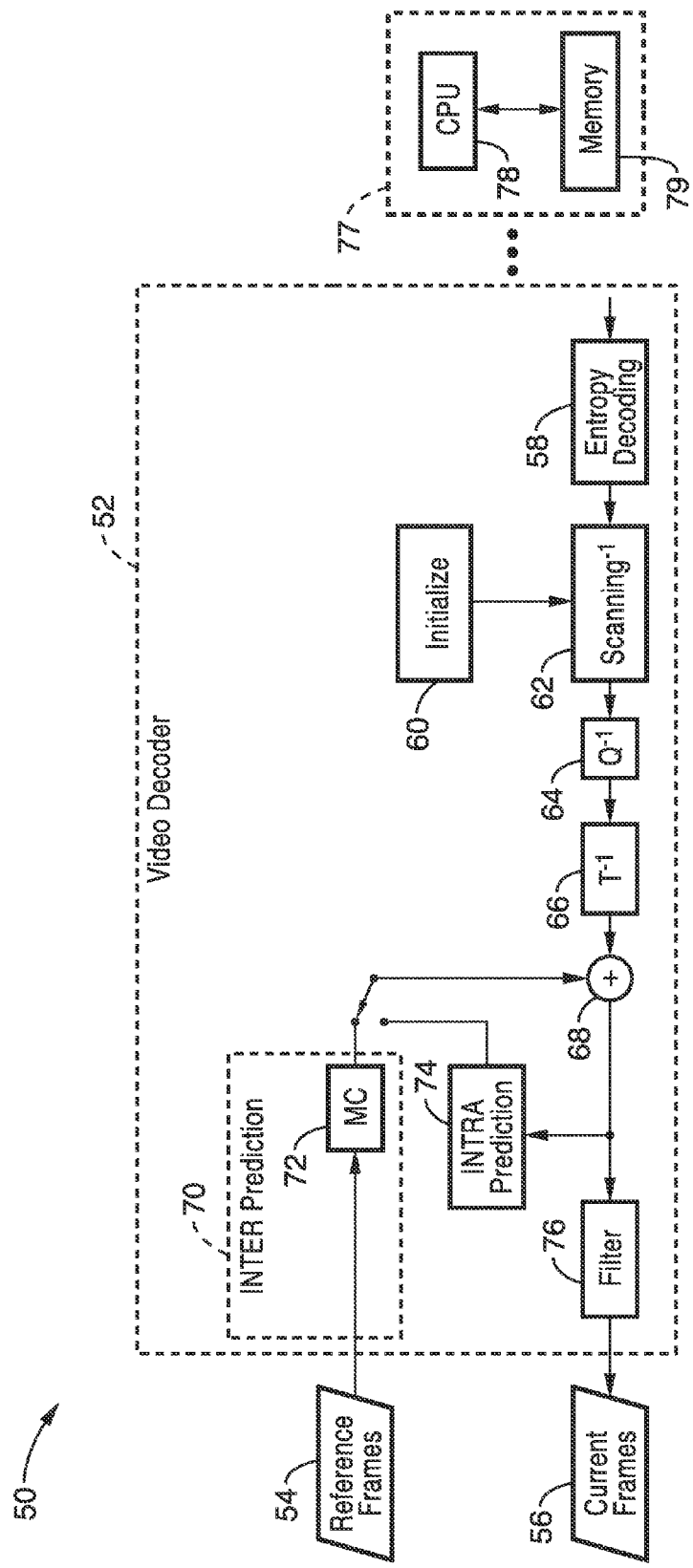

FIG. 1A and FIG. 1B illustrate an example embodiment of a coding apparatus comprising an encoder 10 and decoder 50 configured according to the invention for QP adaptive initialization of coefficient scanning patterns. In the embodiment of the invention shown in the figures, the invention can be implemented as programming which executes within the processing blocks of an otherwise conventional video coding system to minimize development and maximize compatibility. It will be appreciated that a decoding system largely reverses the encoding process, including determining the proper order of the coefficients in response to a decoding process which determines the original scanning order of the coefficients.

The encoder 10 is shown in FIG. 1A having encoding elements 12 executed by one or more processors 47. In this example, frames are denoted as input current frames 14, reference frames 16 and output current frames 18. Difference and sum junctions 28, 44, respectively, are shown configured for switching between inter prediction 20, which is depicted with motion estimation (ME) 22 and motion compensation (MC) 24, and intra prediction 26. Difference junction 28 is shown with an output to transform 30, quantization 32, scanning initialization 34, coefficient scanning 36 and entropy coding 38.

A training process 35 is shown for determining a set of statistics for each combination of block encoding characteristics which include QP. The statistics from this training process provides information on how often (probability) each position of a given block size has a non-zero transform coefficient for each combination of the encoding characteristics, including QP. These statistics on non-zero probability from the training set can be updated during operations of the device as desired, with both encoder and decoder making the same changes in statistics as coding progresses. An initial scanning pattern is determined in response to ranking these probability statistics within scanning initialization block 34. By way of example and not limitation, the training process is depicted in dashed lines to represent an off-line training process for encoder 10.

On the residual side of the encoder, processes for inverse quantization 40 and inverse transforms 42 are performed which are shown coupled to summing junction 44 followed by a filter 46 (deblocking and/or loop filter). Scanning initialization 34 is depicted in response to quantization, other inputs are not shown for the sake of simplicity of illustration. It will be appreciated that information about quantization, as well as block size and prediction mode are available in the encoder, and can be determined in the decoder from information within the encoded video signal.

Encoder 10 is shown implemented with a processing means 47, such as comprising at least one processing device (e.g., CPU) 48, and at least one memory 49, for executing programming associated with the encoder. In addition, it will be appreciated that elements of the present invention can be implemented as programming stored on a media, which can be accessed for execution by a CPU for the encoder and/or decoder.

It should be appreciated, that although the scanning pattern initialization element of the invention is shown operating on a coding system which switches between inter prediction and intra prediction, it can be implemented on any coding system which performs a transform, quantizes those coefficients and scans them according to a selected pattern without departing from the teachings of the present invention.

In the decoder 50 of FIG. 1B, decoding blocks 52 are shown along with a processing means 77, which is substantially a subset of the elements contained in the encoder, shown in FIG. 1A, operating on reference frames 54 and outputting current frames 56. The decoder processing blocks are shown including an entropy decoder 58, scanning initialization 60 coupled to inverse coefficient scanning 62, inverse quantization 64 and inverse transforms 66. Summing 68 is shown between the inverse transform 66 output and the selection (e.g., depicted as a switch) between inter prediction 70 shown with motion compensation 72 and intra prediction 74. Output from summing junction 68 is received by filter 76, which can be configured according to the present invention as a loop filter, a deblocking filter, or any combination thereof. It will be noted that the decoder block diagram does not depict the training process, although the decoder obtains its statistics on transform coefficient non-zero probabilities for each combination of statistics including QP, from the same training process as utilized within the encoder, and performs any updating thereof in the same manner as the encoder.

It should be appreciated that in similar manner to the encoder, decoder 50 can be implemented with a processing means 77 which comprises at least one processing device 78 and at least one memory 79 for executing programming associated with the encoding.

It will be appreciated that the process blocks shown in FIG. 1A-1B can be implemented in hardware, software, or any desired combination of hardware and software. Elements shown in the schematic are symbolic of the function and relationships between these elements, and do not necessarily represent physical hardware elements. For example the switch symbol depicted in FIG. 1A and FIG. 1B, is most typically implemented within the programming of the video coding device and does not represent a physical electrical switch.

The present invention provides improved performance over the fixed scanning of H.264/AVC and scanning techniques which use the same statistical initialization for all values of quantization parameter (QP). Scanning according to the present invention can be applied with a scanning that is initialized to a selected pattern based on a ranking of statistics of non-zero coefficient probability, and which then remains fixed, or to scanning which adapts after initialization, such as by modifying the statistics of non-zero coefficient probability.

Figure 2:
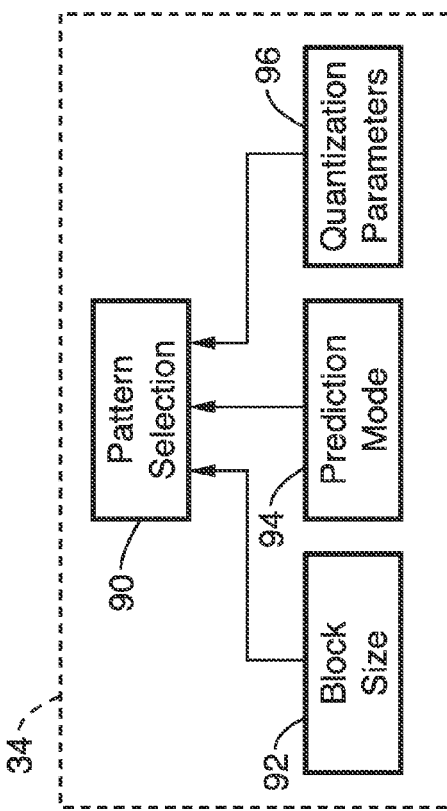
FIG. 2 is a schematic of a scanning pattern initialization module according to an embodiment of the present invention.

FIG. 2 illustrates a schematic of scanning pattern initialization according to an element of the present invention. An initialization block 34, as shown as in FIG. 1A, comprises pattern selection 90 which receives information (coding characteristics/parameters) about block size 92 (e.g., 4×4, 8×8, or 16×16), prediction mode 94 (e.g., intra-prediction modes 0-8 for 4×4 and 8×8, and 0-3 for 16×16), and quantization parameter 96 which was utilized on the transform coefficients.

It should be noted that the coding characteristics, including QP, can be determined in the decoder according to the same or similar manner as described for the encoder. It will be appreciated that information about block size, prediction mode, and QP, can be determined from the encoded video output, which is available on both the encoder and the decoder, although the encoder could alternatively obtain this information directly from other portions of the encoder, such as obtaining information on the quantization parameter directly from the module or programming which performs the quantization.

These coding characteristics, including QP, are then utilized in the pattern selector to select a set of statistics on non-zero coefficient probability for each position in the block, which are ranked to determined an initial scanning pattern based on the combined statistics. It can be considered that tables can be used for containing the probability statistics for each combination of block size, prediction mode and step size value (QP). Accordingly if there existed three different block sizes, nine prediction modes, and four quantization levels, then a total of (3×9×4=108) one hundred and eight tables of statistics would be required. It will be appreciated that in a preferred embodiment the probability statistics for each of these tables is scaled down to a small number to reduce the size of the tables and to simplify performing on-the-fly updates of the statistics as blocks are coded.

The probability statistics for each combination of coding characteristics (e.g., block size, prediction mode, and quantization step size) are initially determined in response to a training process (e.g., off line) in which a large amount of video sequences are coded. As the initial scanning pattern is given by the ranking of these statistics it naturally orders the transform coefficients in an exact decreasing order, based on those statistics which were determined during a large training set. Of course, since the statistics are essentially an average probability taken over a large data set, the actual optimized ordering for a specific block may be slightly different.

An initial set of transform coefficient probability statistics for each combination of coding characteristics, are incorporated into the hardware of the coding apparatus, or more preferably stored as data and/or programming into the coding apparatus (e.g., encoder and/or decoder) for use during coding operations.

Figure 3:
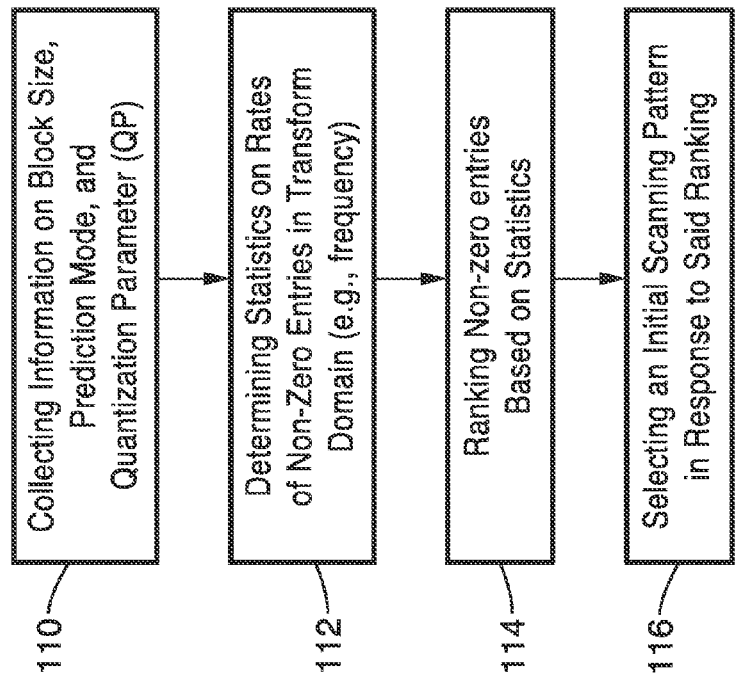
FIG. 3 is a flow diagram of scanning pattern initialization shown according to an embodiment of the present invention.

FIG. 3 is a flowchart of determining an initial scanning pattern according to one implementation of the invention. Information is collected 110 on coding characteristics which include quantization parameter (QP). By way of example these characteristics include block size, prediction mode, and quantization parameter (QP). However, due to the tabular nature of the probability statistics additional characteristics relating to block coding can be easily added while following the teachings of the present invention. Statistics are, or have been determined 112, regarding rates (probabilities) of non-zero entries (for each position entry in the block) in the transform domain. In a preferred embodiment, the statistics are established based on statistics collected over an off-line training process, and then can be updated during actual coding. The statistics for a given combination of characteristics are then ranked 114 based on a decreasing order of importance (e.g., largest coefficient scanned first). The initial scanning pattern is determined 116 from the ranking.

Locating the proper set of statistics for each combination of coding characteristics can be readily implemented using lookup tables. These statistics can then be updated on-the-fly during operation of a combination of encoder and/or decoder. Updates can be performed, for example, during operations of the coder, such as in response to receipt of a new intra picture, and/or in response to other changes in the system, periods of time, and so forth. Updating of the statistics can be application specific depending on the relationship between encoder and decoder. It will be appreciated that on occasion, such as at the beginning of a new intra image, the initialization process is started over again, and on-the-fly updates performed from that point for a short time until the next new intra image.

The novel scanning pattern initialization of the present invention can be utilized with both fixed and adaptive scanning mechanisms without departing from the teachings of the present invention.

The present invention provides advantages over previous forms of initial pattern selection, because by using statistics adapted to the quantization step-size, the high-frequency basis functions are taken into account, and are hence ordered effectively by the inventive coding system.

From the description herein, it will be further appreciated that the invention can be embodied in various ways, which include but are not limited to the following.

The present invention provides methods and apparatus for initializing the scanning pattern used within a video coding apparatus. Inventive teachings can be applied to a wide range of video coding apparatus and applications, including CODECS, video recording and/or playback systems, cameras, video capable cell phones, video processing equipment and/or software, and so forth.

As can be seen, therefore, the present invention includes the following inventive embodiments among others.

1. An apparatus for coding video data, comprising: a computer configured for encoding and/or decoding of video; and programming executable on said computer for initializing a transform coefficient scanning pattern within video predictive coding by performing steps comprising: collecting information on block size, intra prediction mode, and quantization parameter (QP) applied to transform coefficients; performing a ranking of statistical entries collected during a training process of how often an entry in the transform domain is non-zero for a given combination of block size, intra prediction mode, and quantization parameter (QP); and selecting an initial transform coefficient scanning pattern in response to said ranking; wherein said initial transform coefficient scanning pattern is utilized for determining the order in which transform coefficients are encoded into an encoded video signal.

2. The apparatus of embodiment 1, wherein said programming executable on said computer is configured for said selecting an initial transform coefficient scanning pattern is adaptive based on how frequent transform coefficients are non-zero.

3. The apparatus of embodiment 1, wherein said programming executable on said computer is configured for using a fixed or adaptive transform coefficient scanning order.

4. The apparatus of embodiment 1, wherein said programming executable on said computer is configured for initializing said transform coefficient scanning pattern for each new intra picture during said video predictive coding.

5. The apparatus of embodiment 1, further comprising programming executable on said computer for selecting said initial transform coefficient scanning pattern based on prior training of the apparatus which determined statistics on how often a transform coefficient position within the block is non-zero for each combination of block size, prediction mode and quantization parameter.

6. The apparatus of embodiment 1, wherein said apparatus comprises a video encoder.

7. The apparatus of embodiment 6, wherein said programming executable on said computer is configured for performing a transform to create transform coefficients, quantizing the transform coefficients, selecting of said initial transform coefficient scanning pattern to order the placement of transform coefficients prior to entropy coding within said encoded video signal.

8. The apparatus of embodiment 1, wherein said apparatus comprises a video decoder.

9. The apparatus of embodiment 8, wherein said programming is configured for performing said selecting of said initial transform coefficient scanning pattern to determine the ordering of transform coefficients received in an encoded video signal by said video decoder, prior to performing inverse quantization and inverse transforms within said video decoder.

10. An apparatus for coding video data, comprising: a computer configured for encoding and/or decoding of video; and programming executable on said computer for initializing a fixed or adaptive transform coefficient scanning pattern within video predictive coding by performing steps comprising: collecting information on block size, intra prediction mode, and quantization parameter (QP) applied to transform coefficients; performing a ranking of statistical entries collected during a training process of how often an entry in the transform domain is non-zero for a given combination of block size, intra prediction mode, and quantization parameter (QP); and selecting an initial transform coefficient scanning pattern in response to said ranking; and performing initialization of transform coefficient scanning pattern by selecting an initial transform coefficient scanning pattern for each new intra picture during said video predictive coding; wherein said initial transform coefficient scanning pattern is utilized for determining the order in which transform coefficients are encoded into an encoded video signal.

11. The apparatus of embodiment 10, wherein said programming executable on said computer is configured for said selecting an initial transform coefficient scanning pattern is adaptive based on how frequent transform coefficients are non-zero.

12. The apparatus of embodiment 10, further comprising programming executable on said computer for selecting said initial transform coefficient scanning pattern based on prior training of the apparatus which determined statistics on how often a transform coefficient position within the block is non-zero for each combination of block size, prediction mode and quantization parameter.

13. The apparatus of embodiment 10, wherein said apparatus comprises a video encoder.

14. The apparatus of embodiment 13, wherein said programming executable on said computer is configured for performing a transform to create transform coefficients, quantizing the transform coefficients, selecting of said initial transform coefficient scanning pattern to order the placement of transform coefficients prior to entropy coding within said encoded video signal.

15. The apparatus of embodiment 10, wherein said apparatus comprises a video decoder.

16. The apparatus of embodiment 15, wherein said programming is configured for performing said selecting of said initial transform coefficient scanning pattern to determine the ordering of coefficients as received in an encoded video signal by said video decoder, prior to performing inverse quantization and inverse transforms within said video decoder.

17. A method of initializing a scanning pattern for transform coefficients during coding of video in a predictive video coding device, comprising: collecting information on block size, intra prediction mode, and quantization parameter (QP) applied to transform coefficients by a predictive video coding device; and performing a ranking of statistical entries collected during a training process of how often an entry in the transform domain is non-zero for a given combination of block size, intra prediction mode, and quantization parameter (QP); and selecting an initial transform coefficient scanning pattern in response to said ranking; wherein said initial transform coefficient scanning pattern is utilized for determining the order in which transform coefficients are encoded into an encoded video signal.

18. The method of embodiment 17, wherein said method is configured for said selecting an initial transform coefficient scanning pattern is adaptive based on how frequent transform coefficients are non-zero.

19. The method of embodiment 17, wherein said method is configured for using a fixed or adaptive transform coefficient scanning order.

20. The method of embodiment 17, wherein said video coding device comprises a video encoder which selects a scanning pattern into which transform coefficients can be ordered during an encoding process, or a video decoder which selects a scanning pattern which allows determining how transform coefficients are ordered within an encoded video signal.

Embodiments of the present invention may described with reference to flowchart illustrations of methods and systems according to embodiments of the invention. These methods and systems can also be implemented as computer program products. In this regard, each block or step of a flowchart, and combinations of blocks (and/or steps) in a flowchart, can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts support combinations of means for performing the specified functions, combinations of steps for performing the specified functions, and computer program instructions, such as embodied in computer-readable program code logic means, for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for coding video data, comprising:
   a computer configured for encoding and/or decoding of video; and
   programming executable on said computer for initializing a transform coefficient scanning pattern within video predictive coding by performing steps comprising:
   collecting information on block size, intra prediction mode, and quantization parameter (QP) within a training set during an off-line training process for application to transform coefficients;
   utilizing collected information on block size, intra prediction mode, and QP to select a set of statistics on non-zero coefficient probability from a data structure for each position in the block;
   performing a ranking of statistical entries collected in said training set of how often an entry in the transform domain is non-zero for a given combination of block size, intra prediction mode, and quantization parameter (QP); and
   selecting an initial transform coefficient scanning pattern in response to said ranking;
   wherein said initial transform coefficient scanning pattern is utilized for determining an order in which transform coefficients are encoded into an encoded video signal.

2. The apparatus recited in claim 1, wherein said programming executable on said computer is configured for said selecting an initial transform coefficient scanning pattern is adaptive based on how frequent transform coefficients are non-zero.

3. The apparatus recited in claim 1, wherein said programming executable on said computer is configured for using a fixed or adaptive transform coefficient scanning order.

4. The apparatus recited in claim 1, wherein said programming executable on said computer is configured for initializing said transform coefficient scanning pattern for each new intra picture during said video predictive coding.

5. The apparatus recited in claim 1, further comprising programming executable on said computer for selecting said initial transform coefficient scanning pattern based on prior training of the apparatus which determined statistics on how often a transform coefficient position within the block is non-zero for each combination of block size, prediction mode and quantization parameter.

6. The apparatus recited in claim 1, wherein said apparatus comprises a video encoder.

7. The apparatus recited in claim 6, wherein said programming executable on said computer is configured for performing a transform to create transform coefficients, quantizing the transform coefficients, selecting of said initial transform coefficient scanning pattern to order the placement of transform coefficients prior to entropy coding within said encoded video signal.

8. The apparatus recited in claim 1, wherein said apparatus comprises a video decoder.

9. The apparatus recited in claim 8, wherein said programming is configured for performing said selecting of said initial transform coefficient scanning pattern so that the ordering of transform coefficients received in an encoded video signal by said video decoder can be determined, prior to performing inverse quantization and inverse transforms within said video decoder.

10. An apparatus for coding video data, comprising:
    a computer configured for encoding and/or decoding of video; and
    programming executable on said computer for initializing a fixed or adaptive transform coefficient scanning pattern within video predictive coding by performing steps comprising:
    collecting information on block size, intra prediction mode, and quantization parameter (QP) within a training set during an off-line training process for application to transform coefficients;
    utilizing collected information on block size, intra prediction mode, and QP to select a set of statistics on non-zero coefficient probability from a data structure for each position in the block;
    performing a ranking of statistical entries collected in said training set of how often an entry in the transform domain is non-zero for a given combination of block size, intra prediction mode, and quantization parameter (QP);
    selecting an initial transform coefficient scanning pattern in response to said ranking; and
    performing initialization of transform coefficient scanning pattern by selecting an initial transform coefficient scanning pattern for each new intra picture during said video predictive coding;

wherein said initial transform coefficient scanning pattern is utilized for determining an order in which transform coefficients are encoded into an encoded video signal.

11. The apparatus recited in claim 10, wherein said programming executable on said computer is configured for said selecting an initial transform coefficient scanning pattern is adaptive based on how frequent transform coefficients are non-zero.

12. The apparatus recited in claim 10, further comprising programming executable on said computer for selecting said initial transform coefficient scanning pattern based on prior training of the apparatus which determined statistics on how often a transform coefficient position within the block is non-zero for each combination of block size, prediction mode and quantization parameter.

13. The apparatus recited in claim 10, wherein said apparatus comprises a video encoder.

14. The apparatus recited in claim 13, wherein said programming executable on said computer is configured for performing a transform to create transform coefficients, quantizing the transform coefficients, selecting of said initial transform coefficient scanning pattern to order the placement of transform coefficients prior to entropy coding within said encoded video signal.

15. The apparatus recited in claim 10, wherein said apparatus comprises a video decoder.

16. The apparatus recited in claim 15, wherein said programming is configured for performing said selecting of said initial transform coefficient scanning pattern to determine the ordering of coefficients as received in an encoded video signal by said video decoder, prior to performing inverse quantization and inverse transforms within said video decoder.

17. A method of initializing a scanning pattern for transform coefficients during coding of video in a predictive video coding device, comprising:

collecting information on block size, intra prediction mode, and quantization parameter (QP) within a training set during an off-line training process for application to transform coefficients by a predictive video coding device;

utilizing collected information on block size, intra prediction mode, and QP to select a set of statistics on non-zero coefficient probability from a data structure for each position in the block;

performing a ranking of statistical entries collected in said training set of how often an entry in the transform domain is non-zero for a given combination of block size, intra prediction mode, and quantization parameter (QP); and selecting an initial transform coefficient scanning pattern in response to said ranking;

wherein said initial transform coefficient scanning pattern is utilized for determining an order in which transform coefficients are encoded into an encoded video signal.

18. The method recited in claim 17, wherein said method is configured for said selecting an initial transform coefficient scanning pattern is adaptive based on how frequent transform coefficients are non-zero.

19. The method recited in claim 17, wherein said method is configured for using a fixed or adaptive transform coefficient scanning order.

20. The method recited in claim 17, wherein said video coding device comprises a video encoder which selects a scanning pattern into which transform coefficients can be ordered during an encoding process, or a video decoder which selects a scanning pattern which allows determining how transform coefficients are ordered within an encoded video signal.

* * * * *